(12) United States Patent
Williamson

(10) Patent No.: US 7,039,275 B2
(45) Date of Patent: May 2, 2006

(54) FOCUSING FIBER OPTIC

(75) Inventor: Steven L. Williamson, Ann Arbor, MI (US)

(73) Assignee: Picometrix, Inc., Ann Arbor, MI (US)

( * ) Notice: Subject to any disclaimer, the term of this patent is extended or adjusted under 35 U.S.C. 154(b) by 219 days.

(21) Appl. No.: 10/295,512

(22) Filed: Nov. 15, 2002

(65) Prior Publication Data
US 2003/0095746 A1 May 22, 2003

Related U.S. Application Data

(60) Provisional application No. 60/336,302, filed on Nov. 15, 2001.

(51) Int. Cl.
*G02B 6/00* (2006.01)
*G02B 6/26* (2006.01)

(52) U.S. Cl. .......................................... 385/33; 385/47
(58) Field of Classification Search .................. 385/15, 385/31–33, 39, 47, 147; 359/35, 120
See application file for complete search history.

(56) References Cited

U.S. PATENT DOCUMENTS

| | | | |
|---|---|---|---|
| 4,327,963 A * | 5/1982 | Khoe et al. ................... | 385/35 |
| 5,311,611 A * | 5/1994 | Migliaccio ................... | 385/120 |
| 5,366,456 A | 11/1994 | Rink et al. | |
| 5,496,309 A * | 3/1996 | Saadat et al. ................. | 606/15 |
| 5,498,260 A | 3/1996 | Rink et al. | |
| 6,031,953 A | 2/2000 | Rekow et al. | |
| 6,215,925 B1 * | 4/2001 | Kaneyama ................... | 385/35 |
| 6,332,051 B1 | 12/2001 | Ai et al. | |
| 6,445,939 B1 * | 9/2002 | Swanson et al. ............ | 600/342 |
| 6,501,878 B1 * | 12/2002 | Hughes et al. ................ | 385/35 |
| 2003/0021531 A1 * | 1/2003 | Brophy et al. ................ | 385/33 |

FOREIGN PATENT DOCUMENTS

| EP | 0 689 071 A1 | 12/1995 |
|---|---|---|
| EP | 1 079 252 A2 | 2/2001 |

* cited by examiner

*Primary Examiner*—Akm Enayet Ullah
(74) *Attorney, Agent, or Firm*—Brinks Hofer Gilson & Lione

(57) ABSTRACT

The present invention is a fiber optic waveguide adapted for focusing a beam of light at an obtuse angle to the optical axis. A focusing end of the fiber optic is polished at an angle such that the surface normal does not coincide with the optical axis, which is defined by the path of the beam of light through the fiber optic waveguide. The angle θ is necessarily greater than 0 degrees and less than 90 degrees. The present invention further includes a focusing lens coupled to the outside of the fiber optic waveguide at its focusing end. The focusing lens may be a ball lens, and it is attached to the exterior of the cladding layer by an adhesive material.

30 Claims, 2 Drawing Sheets

FOCUSING FIBER OPTIC

CROSS-REFERENCE TO RELATED APPLICATIONS

This application claims the benefit of provisional application 60/336,302 filed Nov. 15, 2001.

FIELD OF THE INVENTION

The present invention relates to a fiber optic waveguide, and in particular to a fiber optic waveguide that is adapted for directing an incident beam of light at a right angle to the optical axis of the fiber.

BACKGROUND AND SUMMARY OF THE INVENTION

Fiber optic waveguides are fibers of glass or of synthetic plastic material typically having a very small diameter on the order of 0.1 to 0.01 mm. A typical fiber optic waveguide comprises a core of glass and a sheath or cladding layer, wherein the index of refraction of the cladding layer is smaller than that of the core. The index of refraction of the core may be constant, or it may vary radially according to a predetermined formula, thereby creating a graded index fiber optic.

Owing to this difference in the index of refraction between the materials constituting the core and the cladding layer, light, entering one end of the fiber, is transmitted along the axis of the fiber within the core. By employing particular types of highly transparent glass, it has been possible to transmit the light from one end of the fiber to the other with very little attenuation or dispersion.

Nevertheless, physical constraints on the behavior of light have prevented the use of fiber optic waveguides in certain applications, notably any application in which the light must be directed at an obtuse angle relative to the optical axis of the fiber over a very short distance. In this case, tightly bending the fiber optic is an inadequate means in that the fiber becomes fatigued and will break or the light will be lost due to radiation at the sharp bend.

In such a circumstance, it has been proposed to utilize mirrors and highly polished optics to reflect the light at the needed angle. In doing so, an apparatus can be designed with convex, concave, or flat optical components for reflecting the incident light. However, while the proposed solutions accomplish some of the stated goals, they do so at an increased cost and with little regard for the overall efficiency and constraints on the bulkiness of the optics Accordingly, the present invention includes a fiber optic waveguide that consists of a cladding layer that surrounds the core, which guides and directs a beam of light. The cladding layer defines a first boundary and a focusing end, where focusing end of the fiber optic waveguide defines a reflecting surface. From the reflecting surface, a surface normal vector is projected for determining the relative position of the surface to the optical axis. The focusing end is polished at an angle such that the surface normal does not coincide with the optical axis, which is defined by the path of the beam of light through the fiber optic waveguide. The angle θ is necessarily greater than 0 degrees and less than 90 degrees. In particular embodiments, the angle θ is between 36 and 55 degrees, and, for particular applications, may be approximately 43 to 49 degrees.

The present invention further includes a focusing lens coupled to the outer surface of the cladding layer of the fiber optic waveguide at its focusing end. The focusing lens may be a ball lens, and it is attached to the exterior of the cladding layer by an adhesive material, preferably of an index-matching type. As such, upon reflection from the focusing end, the beam of light is transmitted through the index-matching adhesive material and through the attached focusing lens to a second boundary, which is the outer surface of the focusing lens. As the focusing lens is spherical in nature, the second boundary appears as a spherical lens to the beam of light. Therefore, the beam of light converges into an circular spot, which is on the order of 5–9 μm in diameter.

DETAILED DESCRIPTION OF THE PREFERRED EMBODIMENT

The present invention generally relates to the focusing and direction of a beam of light onto a structure of interest. In particular, the present invention is particularly suited for channeling laser light through an optical fiber and focus the light emerging from the optical fiber at a right angle to the optical axis. The details of the present invention are discussed further below.

Figure 1:
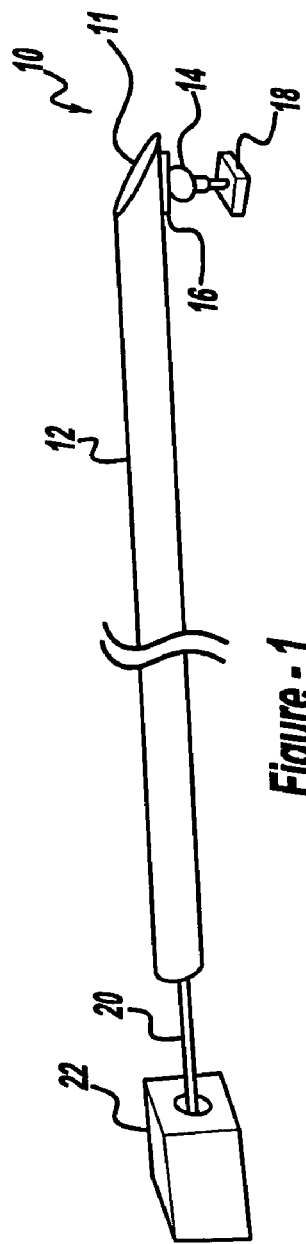
FIG. 1 is a schematic view of a fiber optic focusing system in accordance with the present invention.

The optical fiber focusing system 10 of the present invention is shown in FIG. 1. The optical fiber focusing system 10 is generally comprised of a fiber optic waveguide 12, a light source 22, a focusing optic 14, and a structure of interest 18. The light source 22 generates a beam of light 20 that is channeled through the fiber optic waveguide 12 to its focusing end 11. Upon reaching the focusing end 11, the beam of light 20 undergoes total internal reflection through and passes the focusing optic 14 thereby irradiating the structure of interest 18.

Figure 2:
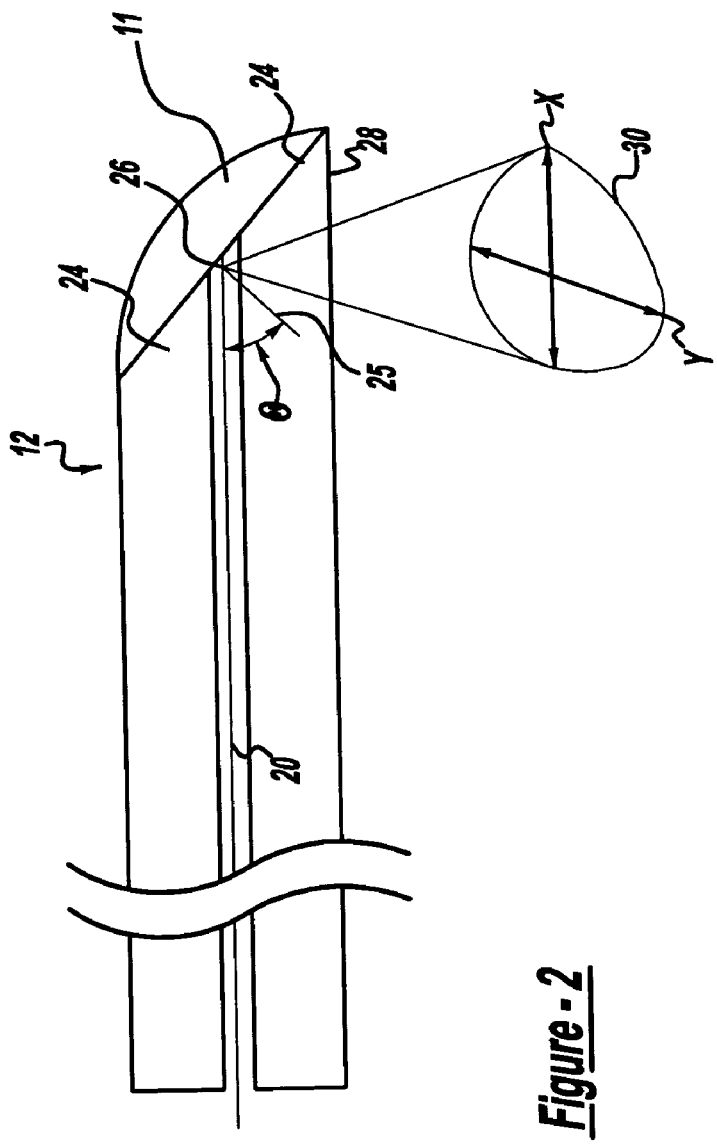
FIG. 2 is a cross-sectional view of a fiber optic waveguide in accordance with the present invention.

The fiber optic waveguide 12 of the present invention is shown in more detail in FIG. 2. The fiber optic waveguide 12 consists of a cladding layer 24 that surrounds and directs the beam of light 20. The cladding layer 24 defines a first boundary 28 and a focusing end 11. The beam of light 20 impinges on the focusing end 11 at a point 26. The focusing end 11 of the fiber optic waveguide 12 defines a reflecting surface which defines surface normal vector 25. The focusing end 11 is polished at an angle such that the surface normal 25 does not coincide with the optical axis, which is defined by the path of the beam of light 20 through the fiber optic waveguide 12. The angle θ is necessarily greater than 0 degrees and less than 90 degrees. In a preferred embodiment, the angle θ is between 36 and 55 degrees, and, for particular applications, may be approximately 43 to 49 degrees.

As the beam of tight 20 impinges on the focusing end 11, certain amounts of the beam of light 20 are transmitted, absorbed, and reflected in accordance with Maxwell's equations. However, it is known that the phenomenon of total internal reflection (TIR) occurs under certain boundary conditions. One such condition is known as Snell's law, which is given by:

$$n_1\sin(\theta_1)=n2\sin(e2), \quad (1)$$

where $n_i$ is the index of refraction of the fiber i, and $\theta_i$ is an angle of incidence. In the present application, $n_1\sin(\theta_1)$ is equal to unity to satisfy the condition of TIR. Equation 1 can be rewritten as:

$$\theta_1 = \sin^{-1}\left(\frac{n_2}{n_1}\right). \quad (2)$$

The index of refraction, $n_1$, of a typical optical fiber is approximately 1.46, and thus the critical angle for total internal reflection, $\theta_1$, is approximately 43 degrees. If the beam of light 20 impinges on the focusing end 11 at an angle of 43 degrees or greater, then the beam of light 20 will be totally reflected.

As shown in the cross-sectional diagram of FIG. 2, the beam of light 20 impinges on the focusing end 11 at the angle $\theta$. The beam of light 20 is thereafter reflected at approximately a right angle to its original axis. The beam of light 20 naturally diverges until it reaches the first boundary 28, at which point it its path is changed again in accordance with Maxwell's equations. The fiber optic waveguide 12 is cylindrical in nature, and thus the first boundary 28 appears as a cylindrical lens to the beam of light 20. As such, the beam of light diverges into an elliptical spot 30, in which the Y-axis is greater than the X-axis.

Figure 3:
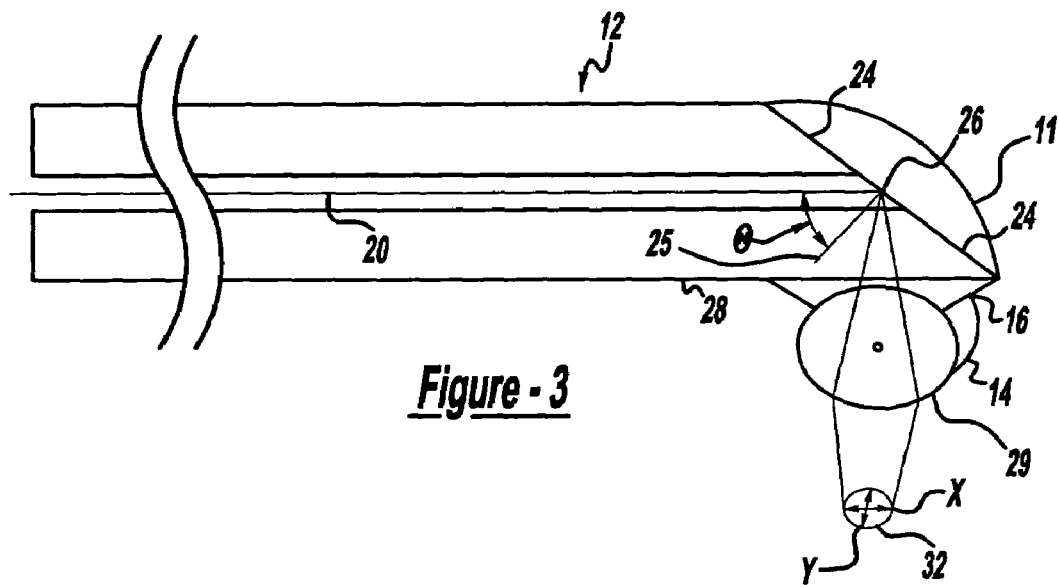
FIG. 3 is a cross-sectional view of an optical fiber for focusing applications in accordance with the present invention.

In order to counteract the rapid and undesirable divergence of the beam of light 20, the fiber optic waveguide 12 is coupled to a focusing lens 14 as shown in FIG. 3. As before, the beam of light 20 impinges on the focusing end 11 at the angle $\theta$. The beam of light 20 is thereafter reflected at approximately a right angle to the optical axis. Again, the beam of light 20 naturally diverges until it reaches the first boundary 28. However, rather than changing its path in accordance with Maxwell's equations, the beam of light is transmitted through the adhesive material 16 and the focusing lens 14 to a second boundary 29. The focusing lens 14 is spherical in nature, and thus the second boundary 29 appears as a spherical lens to the beam of light 20. As such, the beam of light converges into a circular spot 32, in which the Y-axis is equal to the X-axis.

In order to avoid internal reflection at the first boundary 28, the respective indexes of refraction of the adhesive material 16 and the focusing lens 14 must match that of the cladding layer 24. In other words, the indexes of refraction of the adhesive material 16 and the focusing lens 14 are preferably between 1.30 and 1.70, and optimally between the narrower range of 1.45. to 1.50 If the preceding condition is met, then there are no optical boundary conditions at the first boundary 28, and thus there is no total internal reflection or refraction of the beam of light 20. In order to ensure optimal performance, an optical-quality, index-matching cement is the preferred adhesive material 16. Likewise, the focusing optic 14 is preferably a ball-lens having an index of refraction identical to that of the cladding layer 24.

In spite of the improved design of the fiber optic waveguide 12 shown in FIG. 3, the transmission of the beam of light 20 is not perfect. The beam of light 20 that forms the circular spot 32 is not 100% of the incident light. Fresnel's equations state that approximately 4% of the incident beam will be reflected at an air/glass interface, independent of which direction the light is propagating. Insofar as lost responsivity is concerned, a 4% reduction in responsivity is not cataclysmic. However, if a portion of the 4% of the beam of light 20 returns to its original path, i.e. the optical axis, then the result is cross-talk to the network which reduces the system's overall performance.

In most applications, the amount of light that may reflect back into the optical axis must be kept below 1 part in 1000, or 0.1% of the original beam of light 20. This specification is referred to as the optical return loss (ORL) and is typically specified in the units of decibels (dB), a logarithmic measurement of intensity loss. For example, 1 part in 1000 refers to an ORL of −30 dB. In a standard application, a typical beam of light that propagates to the side wall of the fiber and reflects back to the core may cause the ORL to be as high as −9 dB. This means that approximately 100 times more light is re-entering the core than can be tolerated for optimal performance. An attempted solution to the ORL problem is to anti-reflection coat the glass surface of the fiber to eliminate the 4% reflection. This solution is quite expensive to do on each fiber, both in jigging and processing runs. However, the fiber optic waveguide 12 shown in FIG. 3 solves the ORL problem naturally. With an index-matched focusing lens 14 and adhesive material 16, the light is allowed to propagate unimpeded through the cladding layer 24 and the focusing lens 14 with only the second boundary 29 reflecting the aforementioned 4% of the beam of light 20. Not only is this second glass interface 29 further from the optical axis, more importantly, the strong curvature of the focusing lens's 14 surface reflects the light away from the optical axis. Hence, the ORL using the preferred ball lens 14 usually exceeds −40 dB, or 1 part in 10,000 of the light in the original beam.

Figure 4:
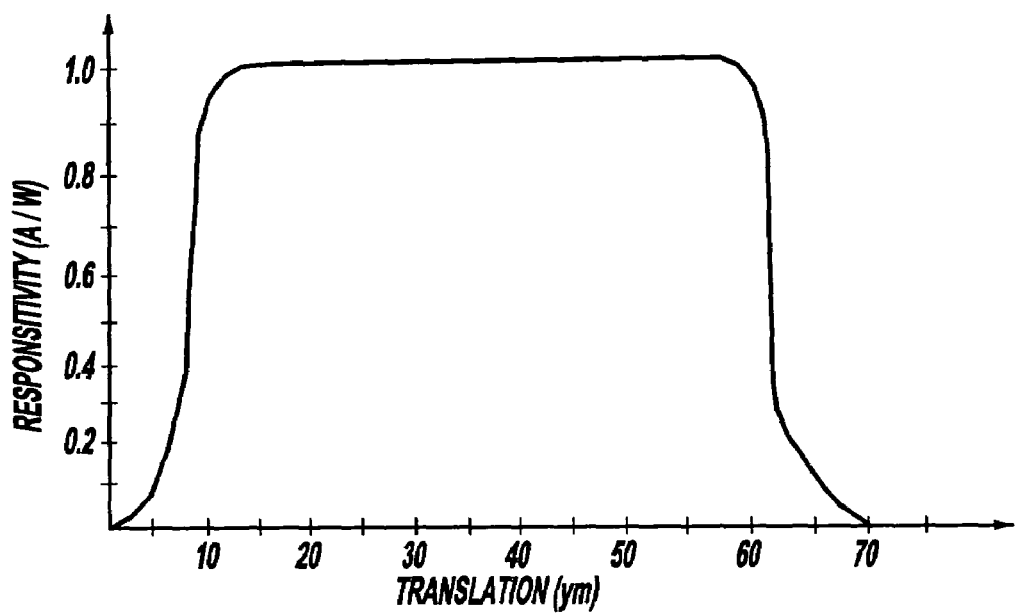
FIG. 4 is a graphical representation demonstrating the spot size of a beam of light focused by the optical fiber of the present invention.

The increased performance of the fiber optic waveguide 12 shown in FIG. 3 has been further demonstrated with respect to the diameter of the circular spot 32. FIG. 4 is a graph representing the relationship between the translation ($\mu$m) of the fiber-lens assembly and the ensuing responsivity (A/W) of the detector the circular spot 32 moves across the abrupt boundry of the detector. This particular data is representative of 34 $\mu$m diameter ball lens coupled to a 45° polished fiber optic waveguide. The detector itself is relatively large, but the detector's edge is very abrupt. This implies that the circular laser spot (formed by the lens) abruptly passes onto the detector when the fiber-lens assembly is translated over the edge of the detector. As shown 10–90% rise in responsivity takes place as the spot is moved from 5 $\mu$m to 10 $\mu$m. This suggests that the focused laser spot (FWHM) is of the order of 5 $\mu$m, or at least within the range between 3 and 15 $\mu$m requiring a ball lens with a diameter of less than about 100 $\mu$m. It is also notable that the responsivity plateaus at 1.0 A/W. This is the theoretical limit for this type detector and indicates that virtually no light is lost in the optical assembly.

As described, the present invention consists of an optical fiber focusing system, a fiber optic waveguide, and a method of making the same. In particular, the fiber optic waveguide is particularly suited for directing an incident beam at an angle perpendicular to the optical axis. Nevertheless, it should be apparent to those skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. An optical fiber focusing system having a light source providing a beam of light for illuminating a structure of interes; the optical fiber focusing system comprising:
   a fiber optic waveguide defining an optical axis and having a receiving end and a focusing end, the focusing end defining a reflecting surface having a surface normal; and
   a focusing lens coupled to the focusing end;
   wherein the surface normal is oriented at an angle to the optical axis such that the beam of light is first reflected from the focusing end then into the focusing optic, and thereafter wherein the beam of light is focused upon the structure of interest wherein the focusing optic is a ball lens coupled to the distal end of the fiber optic waveguide by an adhesive material.

2. The optical fiber focusing system of claim 1 wherein the ball lens and the adhesive material have an index of refraction equal to that of the fiber optic waveguide.

3. The optical fiber focusing system of claim 1 wherein an index of refraction of the fiber optic waveguide is between 1.3 and 1.7.

4. The optical fiber focusing system of claim 1 wherein an index of refraction of the fiber optic waveguide is between 1.45 and 1.50.

5. The optical fiber focusing system of claim 1 wherein the angle of the surface normal relative to the optical axis is between 36 and 55 degrees.

6. The optical fiber focusing system of claim 1 wherein the angle of the surface normal relative to the optical axis is between 43 and 49 degrees.

7. An optical fiber for focusing applications comprising:
   a fiber optic waveguide defining an optical axis end having a receiving end and a focusing end, the focusing end defining a reflecting surface having a surface normal; and
   a ball lens coupled to the fiber optic waveguide at the focusing end by an adhesive material,
   wherein the surface normal is oriented such that a bean propagating along the optical axis is reflected to the ball lens.

8. The optical fiber of claim 7 wherein the adhesive material is a cement.

9. The optical fiber of claim 8 wherein the ball lens and the cement have an index of refraction equal to that of the fiber optic wave guide.

10. The optical fiber of claim 7 wherein an index of refraction of the fiber optic waveguide is between 1.3 and 1.7.

11. The optical fiber of claim 7 wherein an index of refraction of the fiber optic waveguide is between 1.45 and 1.50.

12. The optical fiber of claim 7 wherein the angle of the surface normal relative to the optical axis is between 38 and 55 degrees.

13. The optical fiber of claim 7 wherein the angle of the surface normal relative to the optical axis is between 43 and 49 degrees.

14. The optical fiber of claim 7 wherein the beam focused by the ball lens has a circular cross-section.

15. The optical fiber of claim 7 wherein the beam focused by the ball lens has a spot size that is between 3 and 15 micrometers in diameter.

16. The optical fiber of claim 7 wherein the beam focused by the ball lens has a spot size that is between 5 and 9 micrometers in diameter.

17. A method of making an optical fiber for focusing applications, the method comprising the steps of:
   providing a fiber optic waveguide defining an optical axis and having a receiving end and a focusing end, the focusing end defining a reflecting surface having a surface normal;
   providing a focusing lens having an index of refraction equal to an index of refraction or the fiber optic waveguide;
   polishing the focusing end of the fiber optic waveguide such that the surface normal defines an angle relative to the optical axis;
   coupling the focusing lens to the fiber optic waveguide at the focusing end using an index-matching optical cement such that the fiber optic waveguide and the focusing lens form an assembly that is freely positionable relative to a target of interest.

18. The method of claim 17 further comprising the step of illuminating the fiber optic waveguide such that a beam propagating along the optical axis is reflected at the surface normal.

19. The method of claim 17 further comprising the step of directing a beam of visible light along the optical axis such that the beam is reflected at the surface normal, and further fixing the location of the reflected beam with a target.

20. The method of claim 19 further comprising the step of aligning the focusing lens with the fixed target such that in response to attaching the focusing lens to the fiber optic waveguide, the beam of visible light is focused by the focusing lens.

21. The method of claim 17 wherein the focusing end is polished such that the surface normal defines an angle relative to the optical axis, the angle being between 42 and 52 degrees.

22. The method of claim 17 wherein the index of refraction of the fiber optic waveguide is between 1.4 and 1.5.

23. The method of claim 17 further comprising the step of providing a beam of light, and further focusing the beam of light to a spot size between 5 and 9 micrometers in diameter.

24. The optical fiber focusing system of claim 1, further comprising a detector for receiving the beam of light, and wherein the ball lens is configured to focus the beam of light upon the detector, and wherein the fiber optic waveguide and focusing lens form an assembly that is freely positionable with regard to the detector.

25. The optical fiber focusing system of claim 1 wherein the focusing lens has a diameter less than about 100 micrometers.

26. The optical fiber focusing system of claim 1 wherein the focusing lens has a diameter of about 34 micrometers.

27. The optical fiber focusing system of claim 24 wherein the ball lens has a diameter of less than about 100 micrometers.

28. The optical fiber focusing system of claim 24 wherein the ball lens has a diameter of about 34 micrometers.

29. The optical fiber focusing system of claim 1, wherein the ball lens has a spherical shape.

30. The optical fiber focusing system of claim 7, wherein the ball lens has a spherical shape.

* * * * *

UNITED STATES PATENT AND TRADEMARK OFFICE
CERTIFICATE OF CORRECTION

| | | |
|---|---|---|
| PATENT NO. | : 7,039,275 B2 | Page 1 of 1 |
| APPLICATION NO. | : 10/295512 | |
| DATED | : May 2, 2006 | |
| INVENTOR(S) | : Steven L. Williamson | |

It is certified that error appears in the above-identified patent and that said Letters Patent is hereby corrected as shown below:

Column 5, in claim 1, line 3, before "; the optical fiber" delete "interes" and substitute --interest-- in its place.

Column 5, in claim 7, line 2, after "optical axis" delete "end" and substitute --and-- in its place.

Column 5, in claim 12, line 2, after "is between" delete "38" ad substitute --36-- in its place.

Signed and Sealed this

Thirty-first Day of October, 2006

JON W. DUDAS
*Director of the United States Patent and Trademark Office*